US005682660A

United States Patent [19]

Hansen

[11] Patent Number: 5,682,660

[45] Date of Patent: Nov. 4, 1997

[54] ARROWHEAD EXTRACTOR

[76] Inventor: Robert A. Hansen, 479 St. Joseph, Gatineau, Province of Quebec, Canada, J8P 2Y1

[21] Appl. No.: 680,806

[22] Filed: Jul. 16, 1996

[30] Foreign Application Priority Data

Jul. 2, 1996 [CA] Canada .................................. 2169031

[51] Int. Cl.[6] .................................................. B23P 19/04

[52] U.S. Cl. .............................. 29/264; 29/263; 29/281.6

[58] Field of Search .............................. 29/263, 264, 256, 29/235, 426.5

[56] References Cited

U.S. PATENT DOCUMENTS

| | | | |
|---|---|---|---|
| 4,043,020 | 8/1977 | Hoggard | 29/426.5 |
| 4,194,278 | 3/1980 | Sanders | 29/264 |
| 4,288,900 | 9/1981 | Overton | 29/263 |
| 4,330,917 | 5/1982 | Dzurkovich | 29/264 |
| 4,584,983 | 4/1986 | Ament | 124/89 |
| 4,633,562 | 1/1987 | Ulsh | 29/264 |
| 4,920,625 | 5/1990 | Smith | 29/264 |
| 4,957,095 | 9/1990 | Cameron | 124/89 |
| 4,970,771 | 11/1990 | Wood | 29/263 |
| 4,982,488 | 1/1991 | Ragsdale, Sr. | 29/263 |
| 5,170,548 | 12/1992 | Ramirez | 29/264 |
| 5,216,793 | 6/1993 | Semotiuk | 29/235 |
| 5,408,734 | 4/1995 | Mills et al. | 29/264 |
| 5,416,963 | 5/1995 | Boynton | 29/264 |

*Primary Examiner*—Timothy V. Eley
*Assistant Examiner*—Lee Wilson
*Attorney, Agent, or Firm*—Jones, Tullar & Cooper, P.C.

[57] ABSTRACT

A puller or extractor for removing arrowheads embedded in material such as wood, comprising a rod having a front end with an internally screw threaded socket suitable for engaging the threaded boss of an arrowhead, the rod also having an external screw thread and a rear end part suitable for hand manipulation; and a sleeve having a front end cavity for accommodating the arrowhead. An internally screw threaded bore extends inwardly from a rear end of the sleeve and engages the external screw thread of the rod. The arrangement is such that the rod can be hand rotated by its rear end part to engage the front end of the rod with the boss of the arrowhead, after which the sleeve can be hand rotated in contact with the material surrounding the arrowhead, while the rod is held against rotation, to draw the arrowhead out of the material and into a withdrawn position in the cavity of the sleeve.

9 Claims, 2 Drawing Sheets

ARROWHEAD EXTRACTOR

BACKGROUND OF THE INVENTION

1. Field of the Invention

The present invention relates to a puller or extractor for extracting arrowheads which have become embedded in material such as wood.

2. Prior Art

In recent years there has been a rise in popularity of hunting with bows and arrows. The arrows normally used have steel arrowheads which are fixed to the shaft of the arrows by screw threads which are generally standard. The arrowheads are frequently of the so-called "broadhead" type which have sharp blades diverging from the front point of the arrow.

When a hunter misses his target, the arrowhead may become embedded in a tree or other piece of wood. The arrow shaft may be recovered by unscrewing this from the embedded head, but hunters usually also like to recover the arrowhead itself. Also, in some jurisdictions it is required that hunters do not leave their arrowheads embedded in trees, since these would pose a hazard to wood cutters using chainsaws. Various devices for removing arrowheads from wood have been proposed in the past, and some have been marketed. Some prior designs have a simple handle which screws into the arrowhead, intended to be pulled out by simple manual effort. Others use a rod which can be screwed onto the arrowhead, and a weight which can be slid along the rod to deliver outwardly directed hammer blows to the rod, for example as described U.S. Pat. No. 4,584,983, which issued Apr. 29, 1986 to Ament. Still others use a lever system.

It has also been proposed to use devices which are screw operated, having a threaded rod which can be attached to the arrowhead, a sleeve slidable on the rod and which surrounds the arrowhead, or at least the central shank of the arrowhead, and a nut which threadedly engages the outer end of the sleeve and which can be rotated to draw the threaded rod outwardly relative to the sleeve, pulling the arrowhead into the sleeve. U.S. patents showing this latter type of arrangement are:

U.S. Pat. No. 4,194,278, issued Mar. 25, 1980 to Sanders;

U.S. Pat. No. 4,633,562, issued Jan. 6, 1987 to Ulsh;

U.S. Pat. No. 4,920,625, issued May 1, 1990 to Smith;

U.S. Pat. No. 5,408,734, issued Apr. 25, 1995 to Mills et al., and

U.S. Pat. No. 5,416,963, issued May 23, 1995 to Boynton.

In each of these prior patents, the sleeve remains stationary during the pulling of the arrowhead, providing merely a means for transmitting force between the nut and the wood or like material in which the arrowhead is embedded. In the Sanders and Ulsh patents, the nut used is a wing nut intended to be rotated by a person's fingers. In the remaining patents the nut is intended to be rotated by a wrench. The need for a wrench is an obvious drawback of these latter designs, since a wrench can easily be lost. As for the use of wing nuts, my experience in operating screw type arrowhead extractors suggests that such a device would require more finger strength than possessed by many hunters.

Another drawback of these prior designs is that they involve quite a number of parts, and in many cases the parts are disassembled during use. Obviously working with such equipment out-of-doors brings the possibility of some parts being lost.

SUMMARY OF THE INVENTION

The present invention provides a device of the screw type, but which is essentially different from those listed above because, while using a threaded rod engaged with the arrowhead, it does not use a nut rotating against a stationary sleeve. Instead, it uses a sleeve member of diameter suitable for being gripped and rotated by a user's hand, this being integral or solidly connected with a nut-like rear end portion engaging the threaded rod. With this arrangement it is possible to apply adequate turning force for extraction of the arrowhead without requiring much strength in the user's hand. Also, the device is simplified as compared to prior art screw devices, and it is not necessary to have any auxiliary parts such as wrenches, nor for any parts to be disassembled for use.

In accordance with the present invention, an extractor or puller for removing arrowheads embedded in material such as wood, comprises;

- a rod having a front end with an internally screw threaded socket suitable for engaging the threaded boss on the shank of an arrowhead, the rod also having an external screw thread and a rear end part suitable for hand manipulation,
- a sleeve having a front end cavity for accommodating and completely surrounding an arrowhead and having a smooth annular front end suitable for sliding rotational engagement with the material surrounding the arrowhead, and
- internally screw threaded means solid with a rear portion of the sleeve and engaging the said external screw thread of the rod.

The arrangement is such that the rod can be hand rotated by its rear end part to engage its front end with the boss of the arrowhead, after which the sleeve can be grasped by hand and rotated in contact with the material surrounding the arrowhead, while the rod is held against rotation, to draw the arrowhead out of the material and into a withdrawn position in the front end cavity of the sleeve.

In a preferred embodiment, the sleeve is dimensioned so that a standard broadhead arrowhead can be completely surrounded by the front end portion of the sleeve when the arrowhead has been withdrawn; this protects the user from injury caused by the sharp arrowhead blades. It is also dimensioned so as to be easily and firmly gripped and rotated by a hand. The threaded engagement between the rod and the sleeve is at least one-quarter the overall sleeve length, and preferably at least one-third this length, so that the rod is held axially of the sleeve in spite of any sideways forces.

Another embodiment of the invention is intended for target arrow points. These are relatively small, and do not have blades, so can be accommodated in a much smaller sleeve.

Preferably, the sleeve member has an external surface with means to make it easily gripped and turned by hand; for example the external surface may be knurled. The sleeve member can provide a relatively large area for a hand to grip, compared with the size of wing nuts used in the prior patents of Sanders and Ulsh, or the size of nut type elements which could conveniently be used in the other prior art devices.

BRIEF DESCRIPTION OF THE DRAWINGS

Preferred embodiments of the invention will now be described by way of example with reference to the accompanying drawings, in which.

DETAILED DESCRIPTION

Figure 1:
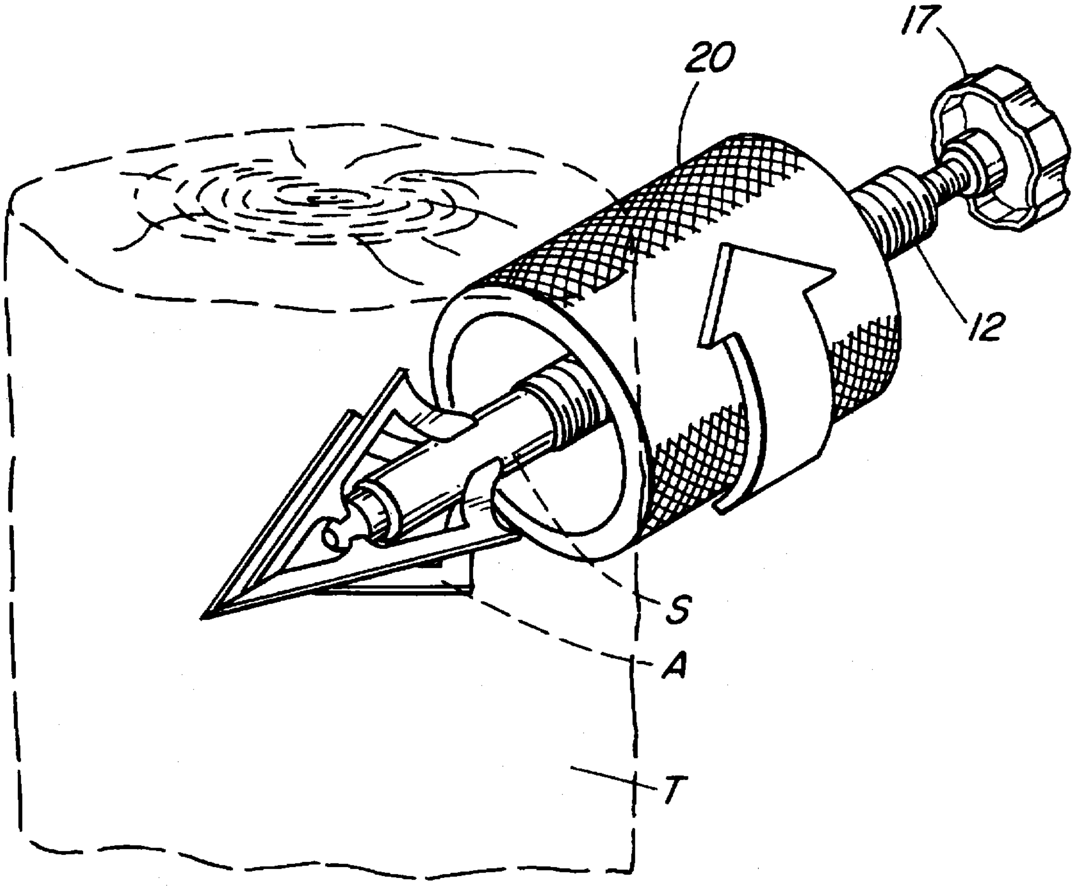
FIG. 1 is a perspective view of the device of this invention engaged with a broadhead arrowhead which is embedded in a tree, the tree being shown ghosted.
Figure 2:
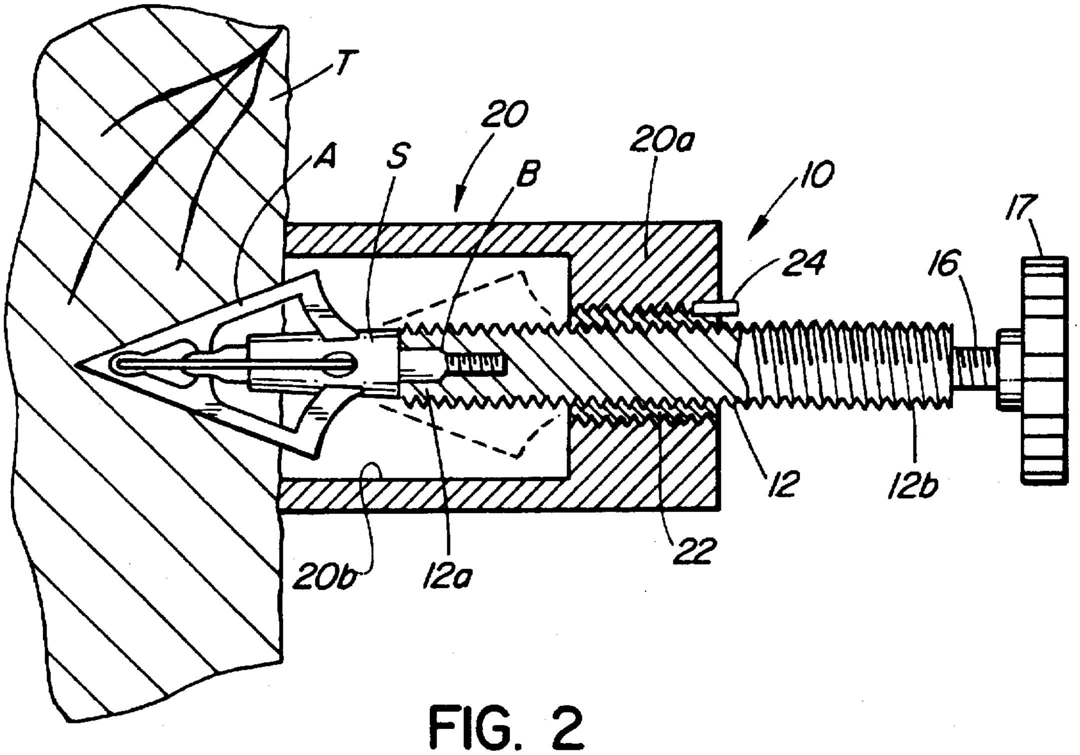
FIG. 2 is a partially sectioned view of the broadhead arrowhead and the device at an initial stage of extraction from the tree, and showing the final position of the arrowhead in broken lines.
Figure 3:
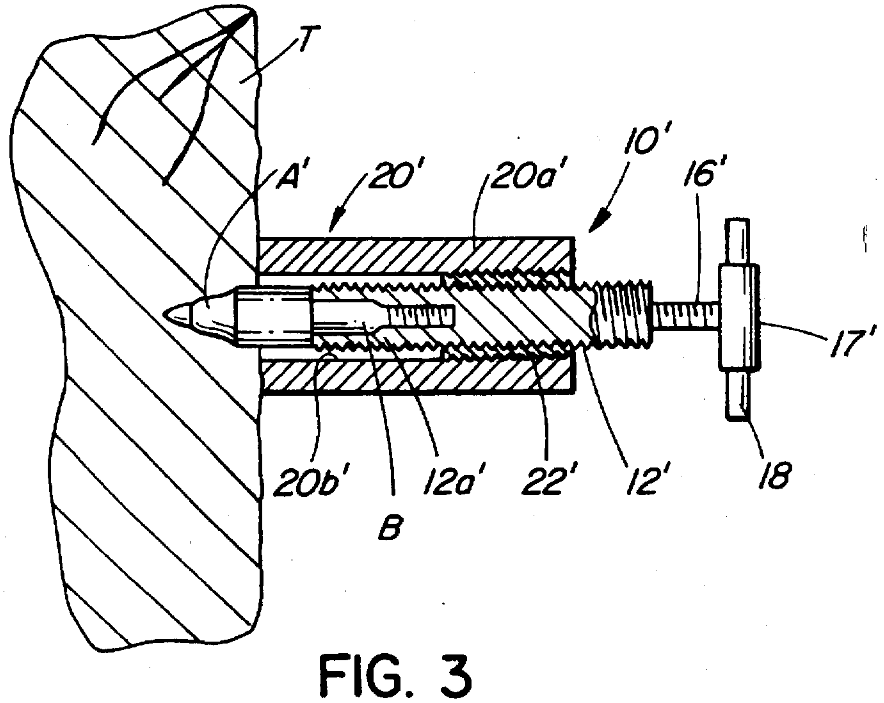
FIG. 3 is a view similar to FIG. 2, and on similar scale, showing an embodiment of the device designed for target arrow points.

Referring to FIGS. 1 and 2, a typical broadhead arrowhead A is shown embedded in a tree T; the arrow shaft having been unscrewed from the head in accordance with usual practice for arrowhead removal. The arrowhead has a central shank S holding radial blades, and has at its rear end a boss B having an inner plain cylindrical portion and an outer threaded end portion having standard threads. This boss is standard for arrowheads both of the broadhead type and the target type.

Arrowhead A is shown connected to the device 10 of this invention. The device has only two relatively movable parts, namely a central rod 12, and an outer sleeve member 20.

The rod 12 is a steel rod of about 4 inches length, and is screw threaded throughout all or most of its length. The rod is about ½ inch in diameter, just slightly more than the diameter of the shank S. At its inner end 12*a* it has a socket suitable for screwing onto the boss B of the arrowhead, which socket includes an outer bore of ¼ inch diameter drilled to a depth of 7/16 inch, and an inner bore of a further ½ inch depth tapped at 8–32 standard thread. When fully screwed into position, the inner end face of the rod 12 locates firmly against end of the shank S and helps to prevent the boss B becoming bent. At its outer end 12*b*, the rod has an axial bore ¼ inch diameter and 1 inch deep, which is threaded to receive rod 16 which is itself threaded into a hand manipulatable knob 17, these latter parts remaining solidly connected at all times.

The central part of rod 12 is threadedly received in a rear portion 20*a* of the sleeve member 20. This sleeve member is suitably machined from aluminum bar stock of 2 inches diameter, and has a length of about 3 inches. The sleeve member has a cylindrical cavity 20*b* occupying its front end portion, the cavity extending throughout about ⅔ of its length, or about 2 inches, and the cavity has a diameter of a little more (say 1/16 inch) than 1.5 inches, or at least larger than the maximum diameter of broadhead arrowhead (including blades) for which the device is to be used.

The internally threaded rear portion 20*a* of the sleeve member which engages the rod is about 1 inch in length, so as to provide adequate support for the rod and to prevent it becoming misaligned with the sleeve if subjected to sideways forces. Preferably this length of engagement is at least ¼ the sleeve length. In order to avoid undue wear on the relatively soft material of the aluminum sleeve member, such as would occur if this had direct threaded engagement with the rod 12, it is preferred, as shown in FIG. 2, for the sleeve member to be provided with a hard wearing steel insert 22 which in turn receives the rod 12. This insert is in the nature of a bushing having threaded engagement with the sleeve member as well as with the rod 12. However, once inserted into the sleeve member, the insert is firmly fixed in position by pins 24, provided as part of the insert, and which are driven into the relatively soft aluminum to key the insert in position. Suitable inserts are those sold under the trademark "KEENSERTS". Whether provided by an insert or directly by the material of the sleeve member, the screw thread is solidly connected to the rear portion of the sleeve.

The sleeve member 20 is designed to be grasped and rotated by hand, and for this purpose it is provided with a knurled outer surface, as shown in FIG. 1. Of course, other means for providing a non-slip surface on the sleeve may be used. Also, since it is rotated with its annular front end face in contact with the material, e.g. the tree, in which the arrowhead is embedded, its front end surface is smoothly machined, with slightly rounded corners, so as to have minimal friction with the wood. In order for the sleeve to be rotated with sufficient force for removing broadhead arrowheads, it is preferably at least 1.75 inches in diameter.

In operation, once the arrow shaft has been removed from the arrowhead, the handle 17 is rotated to advance the rod 12 in the sleeve 20, until the front end of the rod can be screwed firmly onto the boss B of the arrow as shown in FIG. 2. The sleeve is then rotated until it makes contact with the tree, and is then grasped firmly and rotated further in the same sense to withdraw the rod 12 and, with it, the arrowhead. This is continued until the arrowhead is in the broken line position inside the cavity of the sleeve; it will be noted that unlike in some prior art devices there is no risk of the user cutting himself on the blades of an arrowhead being withdrawn. The arrowhead can be transported within the sleeve in this position, the user remaining protected against contact with the points and blades.

It may be noted that this device is very simple, having essentially only two moving parts. At its simplest, it may be formed entirely of two parts, since the rod 12 and handle parts 16, 17, could be replaced with a single bolt, and a simple sleeve member, without any insert 24, could be used. The device as shown is also small enough to be carried in a user's pocket.

FIG. 2 shows a smaller version of the device 10' which is suitable for removing relatively small target arrowheads A' from a material. Such arrowheads have no blades, so the sleeve 20' can be much smaller in diameter than in the first case, for example 1 inch outside diameter is suitable, the internal cavity 20*b*' being 0.5 inch in diameter. Although this means that less torque can be applied to the sleeve, this is satisfactory since the pulling force needed to remove this arrowhead is much less than that required for broadheads. The rod 12' in this embodiment is about 2.25 inches in length, and its threaded engagement with the sleeve portion 20*a* is more than one third the length of the sleeve. The rod 12 engages the sleeve portion 20*a*' indirectly, via an insert 22' which comprises a helical coil of steel wire inserted into a specially made thread; suitable inserts are sold under the trademark "HELICOIL". Both "HELICOIL" and "KEENSERTS" are made by Interfast Industry, of Toronto, Canada. The front end 12*a*' of rod 12 has a formation which is the same as that of the first embodiment, the boss B being standard for both types of arrowhead.

The rear end of the rod 12' has a bore which receives a threaded rod 16' attached to a hand manipulatable handle 17' having two projecting arms 18. Other features of the device are similar to the first embodiment, and the device is used in the same way.

I claim:

1. An extractor for removing an arrowhead embedded in material such as wood, said arrowhead being of the type having a externally threaded boss, comprising;

a rod having a front end with an internally screw threaded socket suitable for engaging the threaded boss of the arrowhead, said rod also having an external screw thread and a rear end part suitable for hand manipulation, a sleeve having a front end cavity for accommodating the arrowhead, and internally screw threaded means located in a rear portion of the sleeve and engaging the said external screw thread of the rod, the arrangement being such that the rod can be hand rotated by its rear end part to engage the socket of the rod with the boss of the arrowhead, after which the sleeve can be hand rotated in contact with the material surrounding the arrowhead, while the rod member remains non-rotating, to draw the arrowhead out of the material and into a withdrawn position in the front end cavity of the sleeve.

2. An extractor according to claim 1, wherein the front end cavity in the sleeve has an internal diameter of more than 1.5 inches, and wherein the internally screw threaded means is spaced at least 1.75 inches from the front end of the sleeve, whereby a standard broadhead arrow can be fully accommodated within said front end cavity when the arrowhead has been withdrawn.

3. An extractor according to claim 1, wherein the sleeve member has an external surface providing a non-slip hand grip allowing hand rotation of the sleeve effective for removing the arrowhead.

4. An extractor according to claim 1, wherein the sleeve member has a knurled external surface.

5. An extractor according to claim 1, wherein the sleeve is formed of aluminum, and wherein the internally screw threaded means includes an internally screw threaded insert of steel.

6. An extractor according to claim 1, wherein said internally screw threaded means extends at least one-quarter of the sleeve length.

7. An extractor according to claim 5, wherein said internally screw threaded means extends at least one-quarter of the sleeve length.

8. An extractor according to claim 1, wherein said internally screw threaded means extends at least one-third of the sleeve length.

9. An extractor according to claim 5, wherein said internally screw threaded means extends at least one-third of the sleeve length.

* * * * *

UNITED STATES PATENT AND TRADEMARK OFFICE
CERTIFICATE OF CORRECTION

PATENT NO. : 5,682,660

DATED : November 4, 1997

INVENTOR(S) : ROBERT A. HANSEN

It is certified that error appears in the above-identified patent and that said Letters Patent is hereby corrected as shown below:

On the cover page of the patent, under Foreign Application Priority Data, "July 2, 1996 [CA] Canada 2169031" should read --February 7, 1996 [CA] Canada 2169031--.

Signed and Sealed this

Thirteenth Day of January, 1998

Attest:

BRUCE LEHMAN

*Attesting Officer*

*Commissioner of Patents and Trademarks*